United States Patent [19]

Desyllas et al.

[11] Patent Number: 4,697,268
[45] Date of Patent: Sep. 29, 1987

[54] DATA PROCESSING APPARATUS WITH MESSAGE ACCEPTANCE MONITORING

[75] Inventors: Peter L. L. Desyllas, Wilmslow; Nicholas P. Holt, Hadfield; Finbar Naven, Cheadle, all of England

[73] Assignee: International Computers Limited, London, England

[21] Appl. No.: 770,745

[22] Filed: Aug. 29, 1985

[30] Foreign Application Priority Data

Sep. 4, 1984 [GB] United Kingdom ............... 8422328

[51] Int. Cl.⁴ ............................................. G06F 11/10
[52] U.S. Cl. ........................................ 371/67; 371/22; 371/11
[58] Field of Search ............... 371/22, 8, 7, 11, 67, 371/68; 364/200, 900; 179/175.20 C; 370/94, 86; 340/825.5

[56] References Cited

U.S. PATENT DOCUMENTS

| | | |
|---|---|---|
| 4,138,599 | 2/1979 | Munter .................................. 371/67 |
| 4,186,380 | 1/1980 | Edwin .................................. 371/11 |
| 4,347,563 | 8/1982 | Paresdes .............................. 371/11 |
| 4,410,985 | 10/1983 | Yasumoto ........................... 371/22 |
| 4,486,883 | 12/1984 | Kanai .................................. 371/67 |
| 4,511,958 | 4/1985 | Funk ................................... 371/33 |
| 4,539,652 | 9/1985 | Robin .................................. 364/900 |
| 4,551,585 | 11/1985 | Daniels ............................... 371/22 |

Primary Examiner—Michael R. Fleming
Attorney, Agent, or Firm—Lee, Smith & Zickert

[57] ABSTRACT

Data processing apparatus includes a number of units connected by a bus over which each unit can send public write messages to all the other units in parallel. The units are connected in a loop by means of public write acceptance lines. Whenever a unit receives a public write message it sends an acceptance signal to the next unit in the loop. Each unit produces an error signal if it receives a public write message but does ot receive any corresponding acceptance signal, or if it receives an acceptance signal without having received a corresponding public write message. Thus, each unit checks its neighbors in the loop to ensure correct reception of the messages.

9 Claims, 2 Drawing Figures

DATA PROCESSING APPARATUS WITH MESSAGE ACCEPTANCE MONITORING

BACKGROUND OF THE INVENTION

This invention relates to data processing apparatus. More specifically, the invention is concerned with data processing apparatus comprising a plurality of units interconnected by a bus, such that any unit can send a message over the bus to all the other units in parallel.

In such apparatus, it may be desirable to check that all the units correctly receive the message from the bus. One way of achieving this would be to arrange for each unit which receives the message to send an acknowledgement back over the bus to the sending unit. However, this could take an excessively long time, since it requires a separate bus cycle for each receiving unit to send its acknowledgement. Alternatively, each of the units could be provided with a separate acknowledgement line to each other unit, allowing all the receiving units to send their acknowledgements simultaneously to the sending unit. However, this requires a large number of special terminals on the units, which is undesirable, especially if each unit is implemented as a very-large scale integrated circuit (VLSI) chip, in which case the number of available terminals is limited.

The object of the present invention is therefore to provide an alternative way of checking that the message is correctly received, which does not suffer from these problems.

SUMMARY OF THE INVENTION

The invention provides data processing apparatus comprising a plurality of units interconnected by a bus, such that any unit can send a message over the bus to all the other units in parallel, wherein (a) the units are arranged in a loop, each unit being connected to the next unit in the loop by means of an acceptance line, (b) whenever any one of the units receives such a message, it sends an acceptance signal over the acceptance line to the next unit in the loop, and (c) each unit monitors the acceptance line from the preceding unit in the loop and, if it does not detect any acceptance signal from that unit following receipt of such a message, or if it detects an acceptance signal without having received such a message, produces an error indication.

It can be seen that each unit is able to check its neighbours in the loop. All the checking is done in parallel, so that it is performed very rapidly. Also, the checking requires only a minimum number of extra wires and terminals: each unit has only one extra pair of terminals for connection to the two adjacent units.

A data processing system embodying the invention will now be described by way of example with reference to the accompanying drawings.

DESCRIPTION OF AN EMBODIMENT OF THE INVENTION

Figure 1:
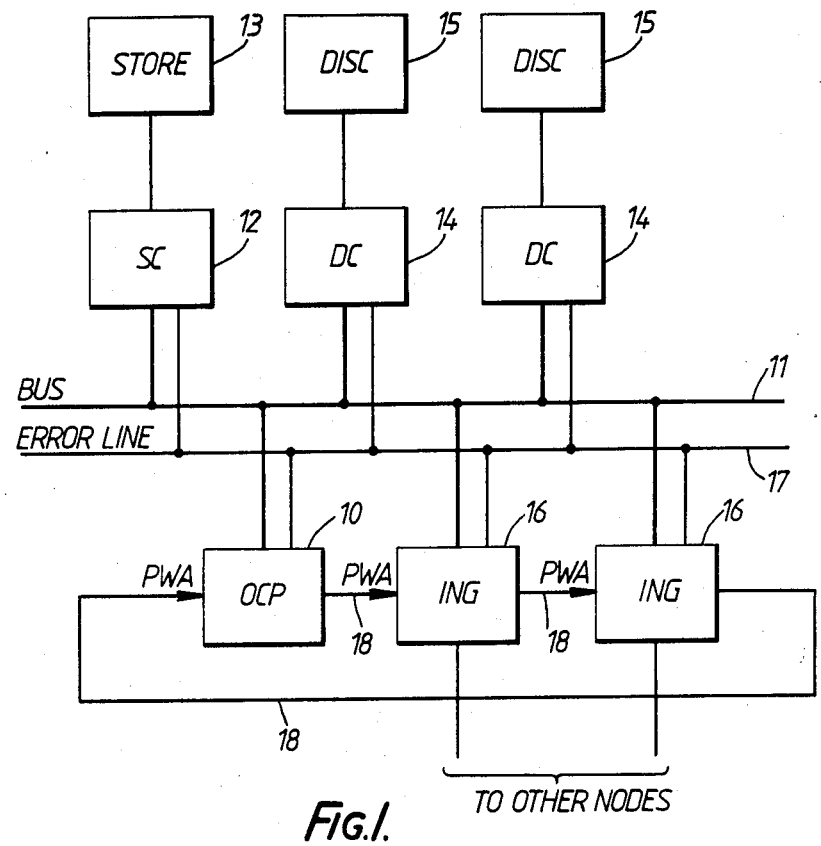
FIG. 1 is a block diagram of a processing node.

The system comprises a number of processing nodes which co-operate together to act as a multi-processor system. FIG. 1 shows one of these nodes; the other nodes are similar in structure. The node comprises a central processing unit, referred to herein as the order code processor (OCP) 10, which is designed to execute programs in a machine-level language. The OCP 10 is connected, by way of a bus 11, to a store controller (SC) 12, which controls a storage unit 13 providing the main data store for the OCP. The bus is also connected to disc controllers (DC) 14 which control disc file units 15, providing backing storage. In addition, the bus is connected to a plurality of inter-node gateway units (ING) 16, which are coupled to similar units in the other nodes, allowing transfer of data between the nodes.

Each of the units OCP, SC, DC and ING conveniently consists of a single VLSI chip. Details of the structure of these units are not necessary for an understanding of the invention and so will not be described herein. It will be appreciated that further units can readily be added to the bus as required: for example, further disc controllers 14 may be added to control further disc files, and further INGs 16 may be added to allow the system to be expanded by adding further nodes. The bus 11 includes the following lines:

(a) A set of 32 data/address lines. These are bidirectional lines and carry data or addresses between the units. A further line carries a parity bit for checking the data or address.

(b) A clock line which distributes a bus clock signal to all the units for synchronising transfers over the bus.

(c) A set of four function lines. These carry a function code specifying a function to be performed by the bus. The functions include READ, WRITE and PUBLIC WRITE functions.

(d) A function valid line. This is raised for one clock beat at the start of each bus transfer cycle to indicate that the function code on the function lines is valid, and that the data/address lines are carrying an address.

(e) Bus request/grant lines. These are bidirectional lines for carrying requests for use of the bus to the OCP 10 from the other units, and for carrying grant signals in the opposite direction.

(f) An ERROR line 17 which can be used by any unit to indicate the presence of an error during a bus transfer cycle e.g. a parity failure. Although the ERROR line 17 is shown separately in the drawing, it is ffectively part of the bus 11.

The OCP 10 acts as the bus master, having overall control of the bus 11. Wnenever one of the other units (SC, DC or ING) requires to use the bus, it sends a request to the OCP on one of the request/grant lines. The OCP grants permission to a requesting unit when the bus becomes free, and that unit then as temporary ownership of the bus. The current owner of the bus can specify a function to be performed, by placing the appropriate function code on the function lines.

In a READ function, the bus owner places an address on the bus to specify the loation of a desired data item. This address is detected oy the unit (e.g. SC) which holds the data item, and the daa is then returned over the bus. In a WRITE function the bus owner places an address on the bus, followed by a data item. The address is detected by one of the other units, and the data is then written into the desired location.

In these READ and WRITE functions, data is transferred between the bus owner and one other unit, as specified by the address placed on the bus. Alternatively, the OCP and the INGs are able to perform PUBLIC WRITE functions, in which a message is broadcast over the bus to all the other units in this group (OCP, ING) in parallel. The SC and DC do not take part in PUBLIC WRITE functions.

Data in the system may be private to a particular node, in which case it is held only in that node. Alternatively, data may be shared between two or more nodes. Such data is refered to as public data, and a separate copy of such data is held in each node which requires it. Hence, whenever public data is updated in one node, it is necessary to update all the copies of that data in the other node. This is done by using the PUBLIC WRITE function, as follows.

The OCP which originated the updating of the public data sends a PUBLIC WRITE message to all the INGs in the same node. Each of these INGs then transfers the message to the corresponding ING in another node to which it is connected. This other ING then sends a PUBLIC WRITE message to the OCP and th other INGs within that other node. This continues until all the OCPs in the system have received the message, allowing them to update all copies of the public data.

Further details of the bus structure and the protocols for use of the bus are of no relevance to the present invention, and so will not be described herein.

Whenever one of the units (OCP, ING) sends a PUBLIC WRITE message, it is necesary to check that the message is correctly received by the other units (OCP, ING) in the node. For this purpose, the units (OCP, ING) are arranged in a loop, with each unit connected to the next unit in the loop by means of a public write accept (PWA) line 18. Whenever one of the units (OCP, ING) receives a PUBLIC WRITE function on the bus, it generates, two clock beats later, a pulse on its output PWA line. This pulse is one clock beat in duration, and represents an acceptance signal for the PUBLIC WRITE functon.

Each unit (OCP, ING) monitors its input PWA line 18. If any unit receives a PUBLIC WRITE function on the bus, but does not receive a pulse on its input PWA line two beats later, it sends a signal on the ERROR line 17. Conversely, if any unit reeives a pulse on its input PWA line but had not been expeting it because it had not received the PUBLIC WRITE function, it sends a signal on the ERROR line.

Thus, it can be seen that each unit (OCP, ING) checks its neighbouring units to ensure that the PUBLIC WRITE functions are correctly received. It should be noted that the checking is performed in parallel, since each unit checks its input PWA line 18 at the same time. Hence, the checking is very rapid.

When a signal occurs on the ERROR line 17, either as the result of the check decribed above or for some other reason such as a parity falure, the OCP 10 is interrupted and performs appropriate tests to discover the nature of the error, and takes appropriate recovery action. This may involve switching off one or more of the units so as to effectively remove it from the node.

It will be noted that if one of the INGs is switched off in this way, the loop formed by the PWA lines 18 is broken. Nevertheless, th checking of the PUBLIC WRITE functions can still be performed, provided at least two of the still operational units (OCP, ING) are interconnected by a PWA line, allowing them to check each other.

Figure 2:
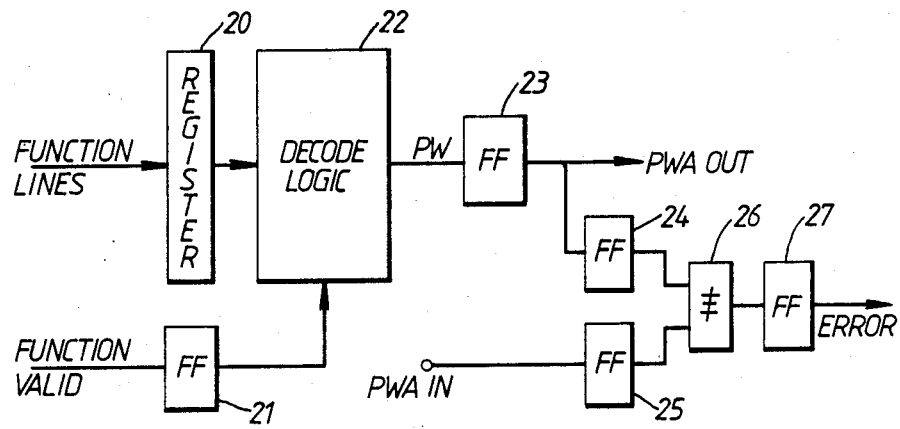
FIG. 2 shows logic for generating and receiving acceptance signals.

FIG. 2 shows a logic circuit which is provided in each of the units (OCP, IG) for generating and monitoring the acceptance signals on the PWA lines.

Each of the units (OCP, ING) includes a function register 20 which is conncted to the function lines of the data bus 11, and a flip-fop 21 connected to the function valid line of the bus. Tne register 20 and flip-flop 21 are both clocked at each clock beat.

When set, the flip-flop enables a decoding logic circuit 22, which then deodes the contents of the register 20 to produce a signal PW if the function code in it indicates a PUBLIC WRITE function. The signal PW is stored in a flip-flop 23 at the next clock beat. The output of this flip-flop is fed to the output PWA line from the unit, so as to send an aceptance signal to the next unit in the loop. The output of the flip-flop 23 also sets another flip-flop 24 at the next clock beat.

The input PWA line from the preceding unit in the loop is fed to a flip-flop 25, which is clocked at each clock beat. The outputs of the two flip-flops 24,25 are combined in a non-equivalence gate 26, and the result is gated into another flip-flop 27 at tne next clock beat. The output of this flip-flop provides an ERROR signal which is fed to the ERROR line 17.

It can be seen that an ERROR signal is produced whenever the contents of the two flip-flops 24,25 are not the same i.e. if a PUBLIC WRITE funtion is detected but no corresponding PWA signal is received, or if a PWA signal is received without any corresponding PUBLIC WRITE function having been detected.

We claim:

1. Data processing apparatus comprising:
  (a) a plurality of data processing units, and
  (b) a bus interconnecting the units for broadcasting public write messages from any one of the units to the other units parallel, wherein the improvement comprises
    (i) a plurality of acceptance lines connecting the units together in a loop,
    (ii) means in each said unit for detecting a public write message on the bus and sending an acceptance signal over the acceptance line to the next unit in said loop, and
    (iii) means in each said unit for monitoring the acceptance line from the preceding unit in said loop and for producing an error signal whenever a public write message detected but no corresponding acceptance signal is received, and whenever an acceptance signal is received without any corresponding public write message.

2. Apparatus according to claim 1 wherein each of said units consists of a single VLSI chip.

3. Apparatus according to claim 1 wherein the error signals from all said units are connected to a common error line.

4. Data processing apparatus comprising:
  (a) a plurality of data processing units, and
  (b) a bus interconnecting the units, for transmitting messages between the units, each message including a function code indicating whether that message is a public write messge intended to be accepted by all said units,
  wherein the improvement comprises:
    (i) a plurality of acceptance lines connecting the units together in a loop,
    (ii) means in each said unit for decoding the function code of each message on the bus, to produce an output acceptance signal if that code indicates that the message is a public write message, the output acceptance signal being fed over the acceptance line to the next unit in said loop, ·

(iii) means in each said unit for receiving an input acceptance signal over the acceptance line from the preceding unit in said loop, and (iv) means in each said unit for comparing the input and output acceptance signals and for producing an error signal if only one of said acceptance signals is present.

5. Data processing apparatus comprising:
 (a) a first plurality of data processing units,
 (b) a second plurality of data processing units, and
 (c) a bus interconnecting all said units, for transmitting messages between the units, each message including a function code indicating whether that message is a public write message intended to be accepted by all of the first plurality of units, wherein the improvement comprises:
 (i) a plurality of acceptance lines connecting the first plurality of units together in a loop,
 (ii) means in each of said first plurality of units for decoding the function code of each message on the bus to produce an output acceptance signal if the code indicates that the message is a public write message, the output acceptance signal being fed over the acceptance line to the next one of said first plurality of units in the loop,
 (iii) means in each said first plurality of units for receiving an input acceptance signal over the acceptance line from the preceding one of said first plurality of units in the looop, and
 (iv) means in each of said first plurality of units for comparing the input and output acceptance signals and for producing an error signal if only one of these acceptance signals is present.

6. Apparatus according to claim 5 wherein at least one of said first plurality of units is a data processor.

7. Apparatus according to claim 6 wherein at least one other of said first plurality of units is a gateway unit for connecting the apparatus to other data processing apparatus.

8. Apparatus according to claim 5 wherein at least one of said second plurality of units is a store controller.

9. Apparatus according to claim 8 wherein at least one other of said second plurality of units is a disc file controller.

* * * * *